(12) United States Patent
Dannoux et al.

(10) Patent No.: US 11,912,605 B2
(45) Date of Patent: Feb. 27, 2024

(54) GLASS ARTICLES

(71) Applicant: CORNING INCORPORATED, Corning, NY (US)

(72) Inventors: Thierry Luc Alain Dannoux, Avon (FR); Vladislav Yuryevich Golyatin, Avon (FR); Randy Lee Rhoads, Penn Yan, NY (US)

(73) Assignee: CORNING INCORPORATED, Corning, NY (US)

( * ) Notice: Subject to any disclaimer, the term of this patent is extended or adjusted under 35 U.S.C. 154(b) by 449 days.

(21) Appl. No.: 17/145,970

(22) Filed: Jan. 11, 2021

(65) Prior Publication Data

US 2021/0130218 A1    May 6, 2021

Related U.S. Application Data

(62) Division of application No. 16/446,849, filed on Jun. 20, 2019, now Pat. No. 10,906,831.
(Continued)

(30) Foreign Application Priority Data

Jul. 17, 2018 (NL) .................................. 2021322

(51) Int. Cl.
  *B32B 15/04*    (2006.01)
  *B32B 17/06*    (2006.01)
  (Continued)

(52) U.S. Cl.
  CPC .......... *C03B 23/037* (2013.01); *C03B 17/067* (2013.01); *C03C 3/091* (2013.01)

(58) Field of Classification Search
  CPC ...................................................... C03C 3/091
  (Continued)

(56) References Cited

U.S. PATENT DOCUMENTS

| 3,635,687 A | 1/1972 | Dunlap et al. |
| 4,248,925 A | 2/1981 | Ambrogi |

(Continued)

FOREIGN PATENT DOCUMENTS

| CN | 101528617 A | 9/2009 |
| CN | 102648164 A | 8/2012 |

(Continued)

OTHER PUBLICATIONS

Taiwanese Patent Application No. 108120831, Office Action dated Feb. 24, 2023, 2 pages (English Translation Only); Taiwanese Patent Office.
(Continued)

*Primary Examiner* — Lauren R Colgan
(74) *Attorney, Agent, or Firm* — Yiqun Zhao

(57) ABSTRACT

A method for making a glass ribbon that includes: flowing a glass into a caster having a width ($W_{cast}$) from about 100 mm to about 5 m and a thickness (t) from about 1 mm to about 500 mm to form an a cast glass; cooling the cast glass in the caster to a viscosity of at least $10^8$ Poise; conveying the cast glass from the caster; drawing the cast glass, the drawing comprising heating the cast glass to an average viscosity of less than $10^7$ Poise and drawing the cast glass into a glass ribbon having a width ($W_{ribbon}$) that is less than $W_{cast}$; and thereafter cooling the glass ribbon to ambient temperature. Further, the cast glass during the cooling, conveying and drawing steps is about 50° C. or higher.

8 Claims, 3 Drawing Sheets

Related U.S. Application Data

(60) Provisional application No. 62/691,031, filed on Jun. 28, 2018.

(51) Int. Cl.
  *C03B 23/037* (2006.01)
  *C03B 17/06* (2006.01)
  *C03C 3/091* (2006.01)

(58) Field of Classification Search
  USPC .................................................. 428/426, 409
  See application file for complete search history.

(56) References Cited

U.S. PATENT DOCUMENTS

| | | |
|---|---|---|
| 6,408,649 B1 | 6/2002 | Sklyarevich et al. |
| 7,231,786 B2 | 6/2007 | Cimo et al. |
| 8,966,940 B2 | 3/2015 | Kumada et al. |
| 9,108,875 B2 | 8/2015 | Jiao et al. |
| 9,670,089 B2 | 6/2017 | Yanase et al. |
| 9,676,650 B2 | 6/2017 | Kariya et al. |
| 9,896,367 B2 | 2/2018 | Bisson et al. |
| 10,377,656 B2 | 8/2019 | Dannoux et al. |
| 10,906,831 B2 | 2/2021 | Dannoux et al. |
| 11,427,493 B2 | 8/2022 | Christopher et al. |
| 11,465,926 B2 | 10/2022 | Delia et al. |
| 11,512,015 B2 | 11/2022 | Delia et al. |
| 2003/0110804 A1 | 6/2003 | Fenn et al. |
| 2004/0197575 A1 | 10/2004 | Bocko et al. |
| 2007/0015651 A1 | 1/2007 | Endo |
| 2009/0019892 A1 | 1/2009 | Fredholm et al. |
| 2009/0100873 A1* | 4/2009 | Allan .................. C03B 17/067 65/85 |
| 2009/0176641 A1 | 7/2009 | Kobayashi et al. |
| 2009/0217705 A1 | 9/2009 | Filippov et al. |
| 2009/0314032 A1 | 12/2009 | Tomamoto et al. |
| 2012/0114904 A1 | 5/2012 | Yanase et al. |
| 2012/0302063 A1* | 11/2012 | Markham ................ B24B 1/00 438/692 |
| 2012/0304695 A1 | 12/2012 | Lakota et al. |
| 2013/0015180 A1 | 1/2013 | Godard et al. |
| 2013/0047671 A1 | 2/2013 | Kohli |
| 2013/0133369 A1* | 5/2013 | Lock .................... C03B 17/065 65/93 |
| 2014/0123703 A1 | 5/2014 | Leblanc et al. |
| 2014/0342120 A1 | 11/2014 | Buellesfeld et al. |
| 2014/0352357 A1 | 12/2014 | Jiao et al. |
| 2014/0357467 A1 | 12/2014 | Buellesfeld et al. |
| 2015/0000345 A1 | 1/2015 | Jiao et al. |
| 2015/0068251 A1 | 3/2015 | Ottermann et al. |
| 2015/0099618 A1 | 4/2015 | Bisson et al. |
| 2015/0218028 A1 | 8/2015 | Tamamura et al. |
| 2015/0284282 A1 | 10/2015 | Godard et al. |
| 2015/0344346 A1 | 12/2015 | Jiao et al. |
| 2015/0344347 A1 | 12/2015 | Fleming et al. |
| 2015/0345996 A1 | 12/2015 | Brackley et al. |
| 2016/0115067 A1 | 4/2016 | De et al. |
| 2016/0121583 A1 | 5/2016 | Edwards |
| 2016/0176746 A1 | 6/2016 | Hunzinger et al. |
| 2017/0057860 A1 | 3/2017 | Habeck et al. |
| 2017/0338428 A1* | 11/2017 | Loeffelbein .......... H10K 50/858 |
| 2018/0079675 A1 | 3/2018 | Afzal et al. |
| 2018/0118601 A1 | 5/2018 | Brown-Tsai et al. |
| 2018/0265391 A1 | 9/2018 | Boratav et al. |
| 2018/0327297 A1 | 11/2018 | Stempin et al. |
| 2018/0339929 A1* | 11/2018 | Katayama ........... H01L 23/3107 |
| 2020/0002211 A1 | 1/2020 | Dannoux et al. |
| 2021/0078894 A1 | 3/2021 | Hoque et al. |
| 2021/0078895 A1 | 3/2021 | Fekety et al. |

FOREIGN PATENT DOCUMENTS

| | | |
|---|---|---|
| CN | 104185611 A | 12/2014 |
| CN | 104768883 A | 7/2015 |
| CN | 106458681 A | 2/2017 |
| CN | 107001101 A | 8/2017 |
| CN | 107531538 A | 1/2018 |
| DE | 102008063554 A1 | 6/2010 |
| DE | 102014119064 A1 | 6/2016 |
| EP | 1710212 A1 | 10/2006 |
| EP | 2039662 A1 | 3/2009 |
| EP | 2452926 A1 | 5/2012 |
| EP | 3587364 A1 | 1/2020 |
| JP | 62-283831 A | 12/1987 |
| JP | 2006-256938 A | 9/2006 |
| JP | 2008-133174 A | 6/2008 |
| JP | 2009-509896 A | 3/2009 |
| JP | 2009-519884 A | 5/2009 |
| JP | 2009-242190 A | 10/2009 |
| JP | 2012-051789 A | 3/2012 |
| JP | 2013-508248 A | 3/2013 |
| JP | 2013-100231 A | 5/2013 |
| JP | 2013-227169 A | 11/2013 |
| JP | 2016-069273 A | 5/2016 |
| JP | 2017-124949 A | 7/2017 |
| TW | 200829523 A | 7/2008 |
| TW | 201109287 A | 3/2011 |
| TW | 201504169 A | 2/2015 |
| WO | 2006/107505 A1 | 10/2006 |
| WO | 2011/004844 A1 | 1/2011 |
| WO | 2011/047008 A1 | 4/2011 |
| WO | 2013/070672 A1 | 5/2013 |
| WO | 2014/009766 A2 | 1/2014 |
| WO | 2014/157649 A1 | 10/2014 |
| WO | 2016/048815 A1 | 3/2016 |
| WO | 2017/104513 A1 | 6/2017 |
| WO | 2020/005555 A1 | 1/2020 |

OTHER PUBLICATIONS

Bocko et al. "Glass for the future: displays and semiconductors", 2013 Symposium on VLSI Circuits, IEEE, pp. C86-C89.

Campbell et al; "Continuous Melting of Phosphate Laser Glasses"; Journal of Non-Crystalline Solids, 263 & 264 (2000); 342-357.

International Search Report and Written Opinion of the International Searching Authority; PCT/US2019/036948; dated Sep. 13, 2019; 13 Pages; European Patent Office.

NL2021322 Search Report dated Mar. 18, 2019; 10 Pages; European Patent Office.

Chinese Patent Application No. 201980043347.5, Office Action, dated Jul. 1, 2022, 18 pages, (9 pages of English Translation and 9 pages of Original Copy); Chinese Patent Office.

* cited by examiner

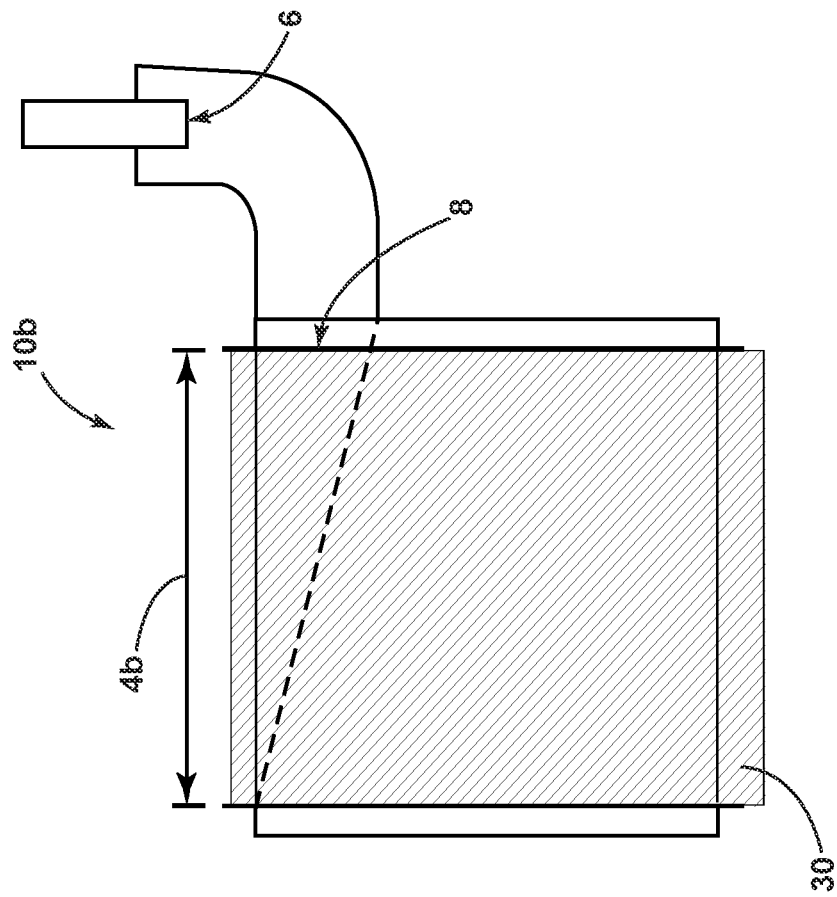
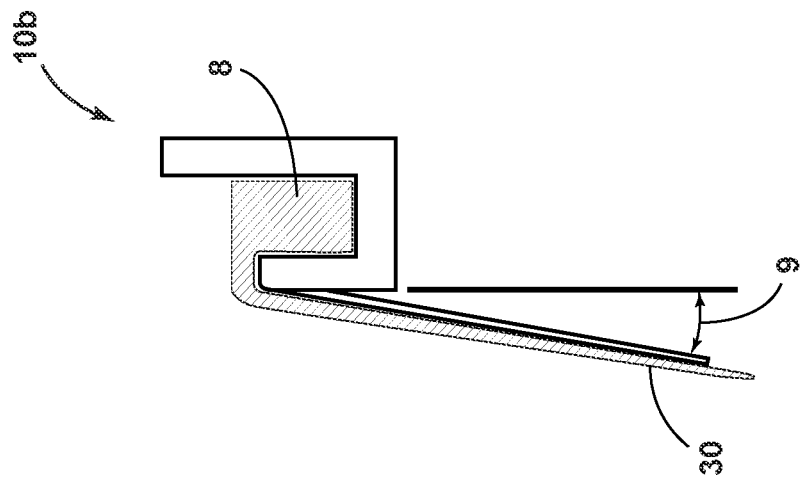

GLASS ARTICLES

CROSS-REFERENCE TO RELATED APPLICATIONS

This application is a divisional of and claims the benefit of priority under 35 U.S.C. § 120 of U.S. application Ser. No. 16/446,849, filed on Jun. 20, 2019, which claims the benefit of priority to Dutch Patent Application No. 2021322, filed on Jul. 17, 2018, which claims benefit of priority under 35 U.S.C. § 119 of U.S. Provisional Application Ser. No. 62/691,031 filed on Jun. 28, 2018, the contents of which are relied upon and incorporated herein by reference in their entirety.

FIELD OF THE DISCLOSURE

The present disclosure relates generally to methods of making glass ribbon and, more particularly, continuous methods of making glass ribbon with high dimensional stability from glass compositions with relatively low liquidus viscosities.

BACKGROUND

Conventional methods of making lenses and other optical components from glass compositions having low liquidus viscosities, including compositions with high refractive indices, are very high in cost with low utilization of the melted glass borne from these methods. Typically, these methods include casting the compositions into long bars with a thickness that is significantly greater in thickness than the final end product. That is, these forming methods produce a cast bar that requires additional processing to obtain a final product form and dimensions.

The additional processing of these cast bars is often extensive. In particular, the cast bar is then sawed into discs. Next, the discs are ground to polish their outer diameter to the final outer dimension of the end product lens. The discs are then wire sawed to a thickness on the order of the final lens end product, and then subjected to a significant battery of grinding and polishing steps to achieve the required warp and dimensional uniformity of the end product lens. Consequently, the conventional processes for forming lenses and other optical components from these glass compositions is high in cost and low in utilization of the melted glass.

SUMMARY OF THE DISCLOSURE

According to some aspects of the present disclosure, a method of making a glass ribbon is provided that includes: flowing a glass into a caster having a width ($W_{cast}$) from about 100 mm to about 5 m and a thickness (t) from about 1 mm to about 500 mm to form an a cast glass; cooling the cast glass in the caster to a viscosity of at least $10^8$ Poise; conveying the cast glass from the caster; drawing the cast glass, the drawing comprising heating the cast glass to an average viscosity of less than $10^7$ Poise and drawing the cast glass into a glass ribbon having a width ($W_{ribbon}$) that is less than $W_{cast}$; and thereafter cooling the glass ribbon to ambient temperature. Further, the cast glass during the cooling, conveying and drawing steps is about 50° C. or higher.

According to some aspects of the present disclosure, a glass article is provided that includes: an unpolished glass ribbon having a thickness from about 1 mm to about 25 mm and a width of 25 mm to about 200 mm. The ribbon comprises a glass selected from the group consisting of borosilicate glasses, aluminoborosilicate glasses, aluminosilicate glasses, fluorosilicate glasses, phosphosilicate glasses, fluorophosphate glasses, sulfophosphate glasses, germanate glasses, vanadate glasses, borate glasses, and phosphate glasses. Further, the composition comprises an upper liquidus viscosity of less than $5\times10^5$ Poise. In addition, the glass ribbon is capable of being sectioned into glass wafers having a thickness variation from about 0.01 μm to about 50 μm and a warp from about 0.01 μm to about 200 μm.

According to some aspects of the present disclosure, a glass article is provided that includes: an unpolished glass wafer having a thickness from about 1 mm to about 25 mm and a width of 100 mm to about 200 mm. The ribbon comprises a glass selected from the group consisting of borosilicate glasses, aluminoborosilicate glasses, aluminosilicate glasses, fluorosilicate glasses, phosphosilicate glasses, fluorophosphate glasses, sulfophosphate glasses, germanate glasses, vanadate glasses, borate glasses, and phosphate glasses. Further, the composition comprises an upper liquidus viscosity of less than $5\times10^5$ Poise. In addition, the glass wafer has a thickness variation from about 0.01 μm to about 50 μm and a warp from about 0.01 μm to about 200 μm.

Additional features and advantages will be set forth in the detailed description which follows, and will be readily apparent to those skilled in the art from that description or recognized by practicing the embodiments as described herein, including the detailed description which follows, the claims, as well as the appended drawings.

It is to be understood that both the foregoing general description and the following detailed description describe various embodiments and are intended to provide an overview or framework to understanding the nature and character of the claimed subject matter.

The accompanying drawings are included to provide a further understanding of the various embodiments, and are incorporated into and constitute a part of this specification. The drawings illustrate the various embodiments described herein, and together with the description serve to explain the principles and operation of the claimed subject matter.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings:

FIGS. 3A and 3B are schematic views of an overflow forming device with an isopipe for flowing glass as employed in a method of making a glass ribbon, according to an embodiment.

Figure 1:
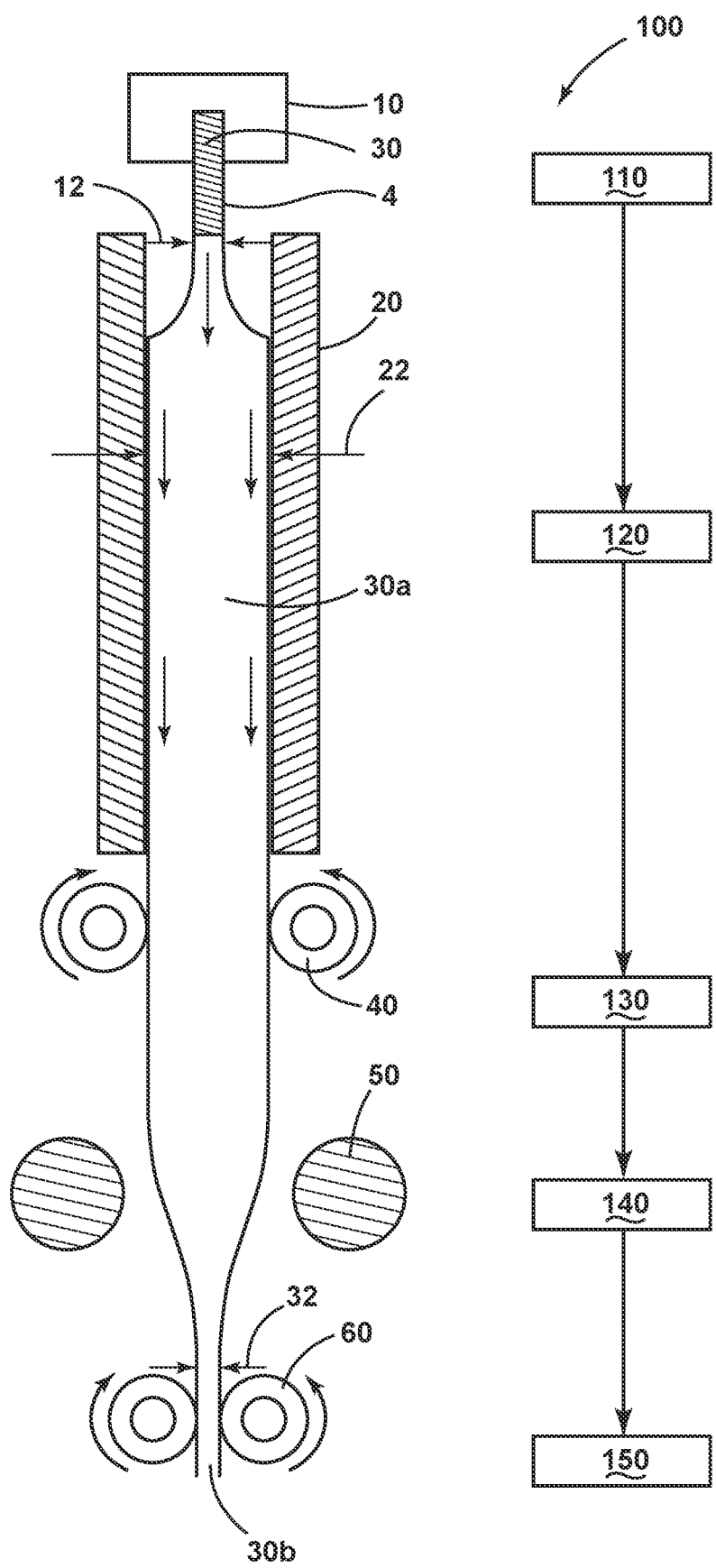
FIG. 1 is a schematic view of a method of making a glass ribbon, according to an embodiment.

The foregoing summary, as well as the following detailed description of certain inventive techniques, will be better understood when read in conjunction with the figures. It should be understood that the claims are not limited to the arrangements and instrumentality shown in the figures. Furthermore, the appearance shown in the figures is one of many ornamental appearances that can be employed to achieve the stated functions of the apparatus.

DETAILED DESCRIPTION OF THE PREFERRED EMBODIMENTS

Additional features and advantages will be set forth in the detailed description which follows and will be apparent to those skilled in the art from the description, or recognized by practicing the embodiments as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Directional terms as used herein—for example up, down, right, left, front, back, top, bottom—are made only with reference to the figures as drawn and are not intended to imply absolute orientation.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the terms "upper liquidus viscosity" and "upper liquidus temperature" refer to the respective viscosity and temperature of the glass employed in the articles and methods of the disclosure at which the glass forms a homogenous melt with no crystals. Further, the terms "upper liquidus viscosity" and "liquidus viscosity" are used interchangeably herein; and the terms "upper liquidus temperature" and "liquidus temperature" are also used interchangeably herein.

As also used herein, the "lower liquidus viscosity" and "lower liquidus temperature" refer to the respective viscosity and temperature of the glass employed in the articles and methods of the disclosure at which the glass can be susceptible to the growth of one or more crystalline phases.

As used herein the "devitrification zone" of the glass employed in the articles and methods of the disclosure is the temperature range given by the upper liquidus temperature to the lower liquidus temperature, e.g., the temperature range in which the glass experiences crystal growth of one or more crystalline phases above 0.01 µm/min.

As used herein, the "average viscosity" of the glass employed in the articles and methods of the disclosure refers to the viscosity of the glass, glass ribbon, glass sheet or other article of the disclosure, as measured during the referenced process or method step (e.g., drawing) over a region of the article and over a time duration sufficient to ascertain an average viscosity value according to analytical and measurement methods understood by those of ordinary skill in the field of the disclosure.

As used herein, the term "continuous" refers to the methods and processes of the disclosure that are configured to form glass sheet, ribbon and other articles without the need for any intermediate and/or post-cooling thermal processing, such as annealing or re-drawing. Put another way, the processes and methods of the disclosure are configured to form glass sheet, glass ribbon and other articles that are not cut or sectioned prior to its drawing step.

As used herein, the "maximum crystal growth rate" refers to the maximum growth rate of any crystalline phases of the glass employed in the articles and methods of the disclosure at a referenced temperature or within a referenced temperature range, e.g., in units of µm/min. As also used herein, the "crystal growth rate" refers to the growth rate of any crystalline phases of the glass employed in the articles and methods of the disclosure at a referenced temperature or within a referenced temperature range, e.g., in units of µm/min.

As used herein, the "thickness variation" of the glass wafer, glass ribbon, glass sheet or other article of the disclosure is measured by determining the difference between the minimum and maximum thickness of the glass wafer, glass ribbon, glass sheet, or other article by a mechanical contact caliper or micrometer, or a non-contact laser gauge for articles having a thickness of 1 mm or greater.

As used herein, the "warp" of the glass wafer, glass ribbon, glass sheet or other article of the disclosure is measured according to the distance in between two planes containing the article, minus the average thickness of the article. For glass ribbons, glass sheet and other glass articles of the disclosure with a substantially rectangular shape, the warp is measured according to principles understood by those of ordinary skill in the field of the disclosure. In particular, the warp is evaluated from a square measurement area with a length defined by the quality area between the beads of the article minus five (5) mm from the inner edge of each of the beads. Similarly, for glass wafers of the disclosure with a substantially circular disk-like shape, the warp is also measured according to principles understood by those of ordinary skill in the field of the disclosure. In particular, the warp is evaluated from a circular measurement area with a radius defined by the outer radius of the wafer minus five (5) mm.

As used herein, the "critical cooling rate" of the glass, glass ribbon, glass sheet or other article of the disclosure is determined by melting multiple samples of the glass, glass sheet or other article down to its glass transition temperature at various, selected cooling rates. The samples are then cross-sectioned according to standard sectioning and polishing techniques, and evaluated with optical microscopy at 100× to ascertain the presence of crystals in the bulk and at its free surfaces (i.e., the top, exposed surface and the bottom surface with an interface with a crucible or the like). The critical cooling rate corresponds to the samples with the lowest cooling rate not exhibiting crystals at its surfaces and bulk.

Referring to the drawings in general and to FIG. 1 in particular, it will be understood that the illustrations are for the purpose of describing particular embodiments and are not intended to limit the disclosure appended claims thereto. The drawings are not necessarily to scale, and certain features and certain views of the drawings may be shown exaggerated in scale or in schematic form in the interest of clarity and conciseness.

Described in this disclosure are methods of making glass ribbon and, more particularly, continuous methods of making glass ribbon for lenses and other optical components from glass compositions with relatively low liquidus viscosities (e.g., $<5\times10^5$ Poise) and/or relatively high refractive indices. The glass ribbon produced according to these methods has high dimensional stability and low warpage, and is produced at final dimensions comparable to those of the intended end products. As a result, the glass ribbon produced according to the methods of the disclosure requires limited post-processing. Consequently, the methods of the disclosure possess a significantly lower manufacturing cost in comparison to conventional glass-forming processes employed in making lenses from glass compositions having low liquidus viscosities. Further, the methods of the disclosure have a significantly higher utilization of the as-melted glass, with low waste.

Notably, the methods of making a glass ribbon of the disclosure are continuous in the sense that they do not require any post-production annealing or other post-production thermal treatments. The methods employ a cooling through the devitrification zone to a temperature above ambient (e.g., >50° C.), e.g., by conveying cast glass through a caster. After cooling the glass to a temperature above ambient, the methods employ an additional drawing step, with some re-heating into the devitrification zone. The drawing step results in a glass ribbon with thickness dimensions on the order of those intended in the final end product, e.g., a wafer, a lens or other optical component having a high refractive index. Further, the drawing step is advantageously conducted for a limited duration at a glass viscosity and temperature that minimizes, or eliminates any possibility of, devitrification. In addition, the methods are particularly advantageous in the sense that they do not require any post-cooling (i.e., after reaching ambient temperature) thermal processing, such as annealing or re-drawing, to obtain the end product, e.g., a glass ribbon, wafer, lens or other glass article. Also advantageously, aspects of the methods of the disclosure result in glass ribbons, wafers, lenses or other glass articles that do not require any additional mechanical processing, e.g., polishing, grinding, etc., to meet warp and/or thickness variation levels of optical components.

Referring now to FIG. 1, a schematic illustration of a method 100 of making a glass ribbon 30b is provided. As shown in FIG. 1, a method 100 of making a glass ribbon 30b is provided that includes a step 110 of flowing a glass 30 from a melting apparatus 10 into a caster 20 having a width ($W_{cast}$) 22 from about 200 mm to about 5 m and a thickness (t) 24 (see FIG. 2) of 1 mm or greater to form a cast glass 30a. The method 100 of making a glass ribbon 30b further includes a step 120 of cooling the cast glass 30a in the caster 20 to a viscosity of at least $10^8$ Poise and a temperature of no lower than 50° C. The method 100 of making a glass ribbon 30b also includes a step 130 of conveying the cast glass 30a from the caster 20. In addition, the method 100 of making a glass ribbon 30b further includes a step 140 of drawing the cast glass 30a at an average viscosity of less than $10^7$ Poise into a glass ribbon 30b having a width ($W_{ribbon}$) 32 that is less than the width ($W_{cast}$) 22 of the cast glass 30a, and to a final thickness 24 (t). Further, the drawing step 140 comprises heating the cast glass 30a to an average viscosity of less than $10^7$ Poise. The method 100 of making a glass ribbon 30b further includes a step 150 of cooling the glass ribbon 30b to ambient temperature.

With regard to the step 110 of flowing the glass shown in FIG. 1, a suitable melting apparatus 10 may deliver the glass 30 via an exit element 4 having a maximum dimension 12, which is the approximate width of the glass 30 as it leaves the melting apparatus 10 and flows into the caster 20. Depending on the viscosity of the glass 30 flowing from the melting apparatus 10, it can have a width that is about the same as, or smaller, than the maximum dimension 12 of the exit element 4. According to some embodiments of the method 100 of making a glass ribbon 30b, the maximum dimension 12 of the exit element 4 is less than or equal to the width ($W_{cast}$) 22 of the caster 20. In other embodiments, the maximum dimension 12 of the exit element 4 can be larger than the width ($W_{cast}$) 22 of the caster 20, e.g., for compositions of the glass 30 that have a relatively low upper liquidus viscosity (e.g., 5 Poise to 5000 Poise). In particular, these glasses upon melting can 'neck' as they leave the exit element 4 of the melting apparatus 10, allowing them to flow into a caster 20 having a width 22 that is smaller in dimension than the maximum dimension 12 of the exit element 4 of the melting apparatus 10.

Referring again to the method 100 of making a glass ribbon 30b depicted in FIG. 1, embodiments of the melting apparatus 10 include an overflow forming device in which the exit element 4 serves to distribute the glass 30 or a melter with an exit element 4 in the form of an orifice. In the latter embodiment, the melting apparatus 10 can include a weir, which allows the glass 30 to overflow and spread along an exit element 4 in the form of an isopipe (see, e.g., the overflow forming device with an isopipe depicted in FIGS. 3A and 3B). In such embodiments, the glass 30 can spread on one or both sides of the isopipe. As to the former embodiment, melting apparatus 10 can include a melter with an orifice that distributes the melted glass 30 as it leaves the melting apparatus 10. Further, those with ordinary skill in the field of the disclosure can construct other melting apparatus 10 suitable for use in the method 100 of making a glass ribbon 30b.

In embodiments of the method 100 of making a glass ribbon 30b depicted in FIG. 1, the glass 30 is derived from a glass composition including borosilicate glasses, aluminoborosilicate glasses, aluminosilicate glasses, fluorosilicate glasses, phosphosilicate glasses, fluorophosphate glasses, sulfophosphate glasses, germanate glasses, vanadate glasses, borate glasses, and phosphate glasses. According to an embodiment, the glass 30 is derived from any of the glass compositions, as exhibiting optical properties (e.g., transmissivity, refractive index, coefficient of thermal expansion, etc.) suitable for lenses and optical components. According to an embodiment, the glass 30 is derived from the following glass composition (referred herein as "Glass A"): 40.2 mol % $SiO_2$; 2.4 mol % $B_2O_3$; 11.3 mol % $Li_2O$; 22.9 mol % CaO; 5.4 mol % $La_2O_3$; 3.8 mol % $ZrO_2$; 4.8 mol % $Nb_2O_5$; and 9.3 mol % $TiO_2$.

According to another embodiment, the glass 30 is derived from the following glass composition (referred herein as "Glass B"): 42.7 mol % $SiO_2$; 3.9 mol % $B_2O_3$; 4.7 mol % BaO; 26.6 mol % CaO; 4.5 mol % $La_2O_3$; 2.2 mol % $ZrO_2$; 6.1 mol % $Nb_2O_5$; and 9.3 mol % $TiO_2$.

In some embodiments of the method 100 of making a glass ribbon 30b depicted in FIG. 1, the glass 30 comprises an upper liquidus viscosity of less than $5\times10^5$ Poise. According to some implementations, the glass 30 may be comprised of a composition that exhibits an upper liquidus viscosity of less than $5\times10^5$ Poise, of less than $1\times10^5$ Poise, of less than $5\times10^4$ Poise, of less than $1\times10^4$ Poise, of less than $5\times10^3$ Poise, of less than $1\times10^3$ Poise, of less than $5\times10^2$ Poise, of less than 100 Poise, of less than 50 Poise, of less than 40 Poise, of less than 30 Poise, of less than 20 Poise, of less than 10 Poise, and all upper liquidus viscosities between these levels. According to some implementations of the method, the upper liquidus viscosity of the glass 30 during the step 110 ranges from about 5 Poise to about 50000 Poise. Further, in certain implementations of the method 100, the glass 30 is derived from a glass composition having a refractive index from about 1.5 to about 2.1. In some embodiments, the glass 30 is derived from a glass composition having a refractive index from about 1.6 to about 2.0, from about 1.65 to about 1.9, from about 1.7 to about 1.85, and all refractive index values between these levels.

Referring again to the flowing step 110 of the method 100 of making a glass ribbon 30b depicted in FIG. 1, this step can be conducted such that the glass 30 is flowed at a temperature of 1000° C. or greater. The glass 30 may be flowed at a temperature from about 1000° C. to about 1500° C., from about 1000° C. to about 1400° C., from about 1000° C. to about 1300° C., from about 1000° C. to about 1250° C., from about 1000° C. to about 1200° C., from about 1000° C. to about 1150° C., and all values between these levels. The flowing step 110 may be conducted such that the glass 30 has a viscosity of less than $5\times10^4$ Poise as it flows from the melting apparatus 10. In some implementations, the glass 30, as it leaves the exit element 4 of the melting apparatus 10 and flows into the caster 20, has a viscosity of less than $5\times10^4$ Poise, of less than $1\times10^4$ Poise, of less than $5\times10^3$ Poise, of less than $1\times10^3$ Poise, of less than $5\times10^2$ Poise, of less than 100 Poise, of less than 50 Poise, of less than 40 Poise, of less than 30 Poise, of less than 20 Poise, of less than 10 Poise, and all viscosities between these levels. According to some implementations of the method 100, the glass 30, as it leaves the melting apparatus 10, has a viscosity during the step 110 that ranges from about 10 Poise to about 1000 Poise, or from about 10 Poise to about 50,000 Poise.

Figure 2:
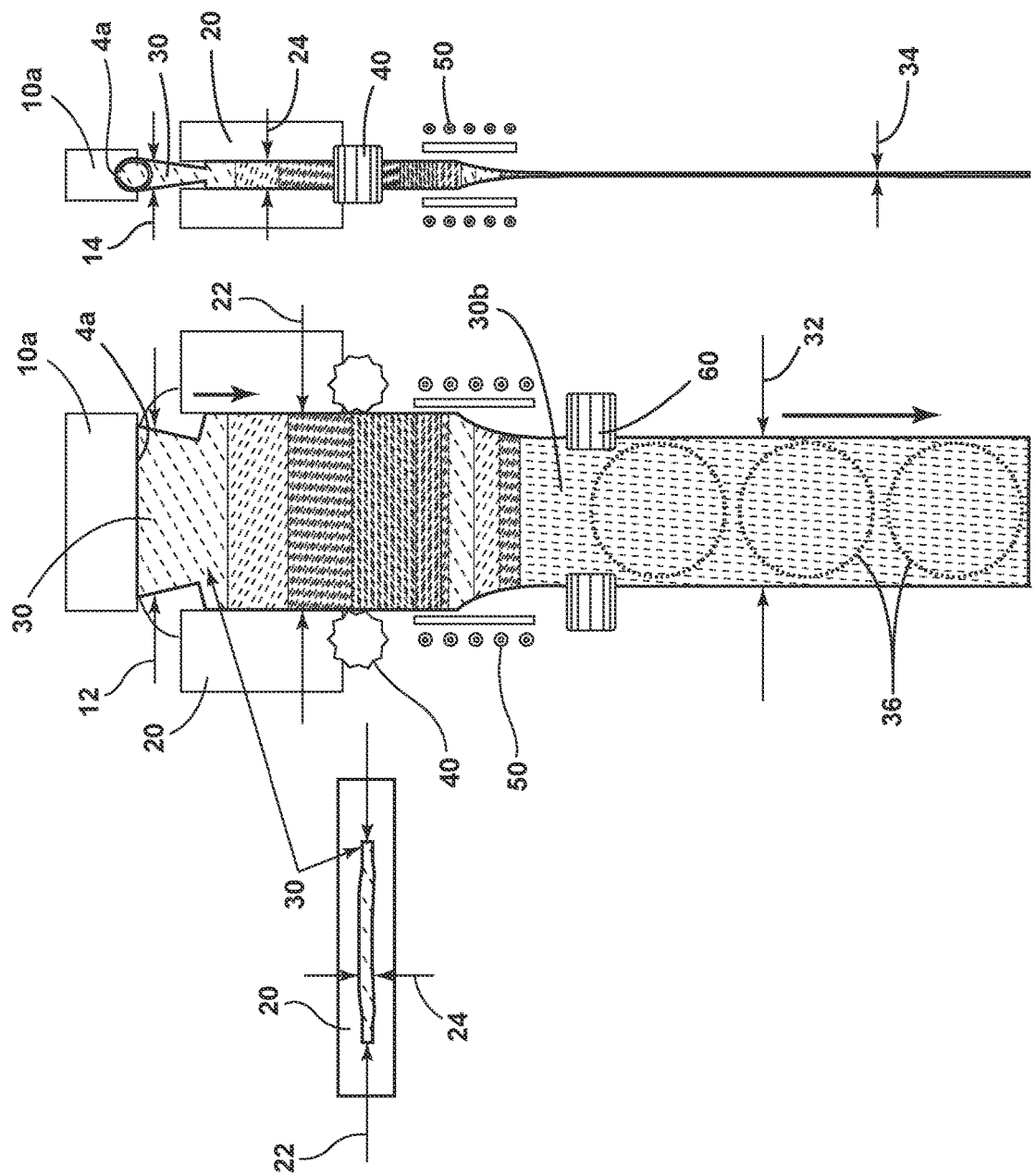
FIG. 2 is a schematic view of apparatus that can be employed according to a method of making a glass ribbon, particularly a melting apparatus with an orifice, a caster and a heating apparatus, according to an embodiment.

Referring again to the step 110 of the method 100 of making a glass ribbon 30b depicted in FIG. 1, the step includes flowing the glass 30 into a caster 20 having a width ($W_{cast}$) 22 from about 200 mm to about 5 meters (m) and a thickness (t) 24 from about 1 mm to about 500 mm to form the cast glass 30a (see also FIG. 2). In some embodiments, the width ($W_{cast}$) 22 of the caster 20 is from about 200 mm to about 5 meters (m), from about 250 mm to about 5 m, from about 300 mm to about 5 m, from about 350 mm to about 5 m, from about 400 mm to about 5 m, from about 450 mm to about 5 m, from about 500 mm to about 5 m, and all width values between these levels. According to some implementations, the width ($W_{cast}$) 22 of the caster 20 is from about 200 mm to about 5 m, from about 200 mm to about 4 m, about 200 mm to about 3 m, about 200 mm to about 2 m, about 200 mm to about 1 m, about 200 mm to about 0.9 m, about 200 mm to about 0.8 m, about 200 mm to about 0.7 m, about 200 mm to about 0.6 m, about 200 mm to about 0.5 m, and all width values between these levels. Further, in some embodiments, the thickness (t) 24 (see FIG. 2) of the caster 20 is about 1 mm or greater, about 2 mm or greater, about 3 mm or greater, about 4 mm or greater, about 5 mm or greater, about 7 mm or greater, about 8 mm or greater, about 9 mm or greater, about 10 mm or greater, about 15 mm or greater, about 20 mm or greater, about 25 mm or greater, about 30 mm or greater, about 35 mm or greater, about 40 mm or greater, about 45 mm or greater, about 50 mm or greater, or any thickness up to about 500 mm.

Referring now to step 120 of the method 100 of making a glass ribbon 30b depicted in FIG. 1, this step is for cooling the cast glass 30a in the caster 20 to a viscosity of at least $10^8$ Poise and a temperature of no lower than 50° C. As such, the caster 20 can be of varied construction, e.g., of various materials with or without additional cooling capabilities, as understood by those of ordinary skill in the field of the disclosure, provided that it is capable of cooling the glass 30 through its devitrification zone to cool the cast glass 30a to a temperature of no lower than 50° C., e.g., as it is being conveyed in the direction of the arrows shown in FIG. 1 by the tractor 40. The step 120 of cooling the cast glass 30a may be conducted such that the maximum growth rate of any crystalline phase is less than 10 μm/min from the upper liquidus viscosity to the lower liquidus viscosity of the glass 30a (also referred to herein as the "devitrification zone"). In some implementations, the step 120 of cooling the cast glass 30a is conducted such that a maximum growth rate of any crystalline phase of the glass 30 through the devitrification zone is less than 10 μm/min, less than 9 μm/min, less than 8 μm/min, less than 7 μm/min, less than 6 μm/min, less than 5 μm/min, less than 4 μm/min, less than 3 μm/min, less than 2 μm/min, less than 1 μm/min, less than 0.5 μm/min, less than 0.1 μm/min, less than 0.01 μm/min, and all growth rates below and/or between these rates. Notably, the maximum crystal growth rate (Vmax) for the Glass A and Glass B compositions is about 6-7 μm/min at 1030° C. and about 2-3 μm/min at 1050° C., respectively. Accordingly, aspects of the method 100 include performing the cooling step 120 such that the crystal growth rate of glass 30, when fabricated from the Glass A or Glass B composition, are less than these maximum crystal growth rate (Vmax) values.

According to another aspect of the method 100 of making a glass ribbon 30b depicted in FIG. 1, the cooling step 120 can be conducted to cool the cast glass 30a to a temperature (i.e., no lower than 50° C.) at or above a critical cooling rate for the cast glass 30a. As used herein, the "critical cooling rate" is determined by melting multiple samples of a given glass composition down to its glass transition temperature at various, selected cooling rates. The samples are then cross-sectioned according to standard sectioning and polishing techniques, and evaluated with optical microscopy at 100× to ascertain the presence of crystals in the bulk and at its free surfaces (i.e., the top, exposed surface and the bottom surface with an interface with a crucible or the like). The critical cooling rate corresponds to the samples with the slowest cooling rate not exhibiting crystals at its surfaces and bulk.

According to an embodiment, the tractor 40 includes one or more rollers for controlling the velocity of the cast glass 30a as it travels through and exits the caster 20 during the cooling step 120 and conveying step 130, respectively. Advantageously, the cooling step 120 is conducted in a fashion to ensure that the cast glass 30a does not fall below 50° C., to ensure that the method 100 can remain continuous in view of the additional heating that occurs during the subsequent conveying step 130 and drawing step 140, respectively. In some aspects, the thermal energy remaining in the cast glass 30a after the cooling step 120 is employed to re-heat the cast glass 30a from its core toward its surface during the subsequent conveying and drawing steps 130 and 140, respectively.

In some implementations of the method 100 depicted in FIG. 1, the temperature during the cooling step 120 is no lower than 50° C., no lower than 100° C., no lower than 150° C., no lower than 200° C., no lower than 250° C., no lower than 300° C., no lower than 350° C., no lower than 400° C., no lower than 450° C., no lower than 500° C., and all temperature values between these lower threshold levels. In an implementation of the method 100, the cooling step 120 comprises cooling the cast glass 30a in the caster 20 to a temperature of less than 800° C. and no lower than 50° C. According to an implementation of the method 100, the flowing, cooling, pulling and drawing steps 110-140 are conducted such that the cast glass 30a does not reach a temperature below 50° C., e.g., to ensure that the method 100 can be run in a continuous fashion. According to some embodiments of the method 100, the step of cooling 120 is conducted such that the cast glass 30a in the caster 20 is at a viscosity of at least $10^8$ Poise, at least $5 \times 10^8$ Poise, at least $10^9$ Poise, at least $5 \times 10^9$ Poise, at least $10^{10}$ Poise, at least $5 \times 10^{10}$ Poise, or higher viscosities. In some aspects of the method 100 of making a glass ribbon 30b, the cooling step 120 is conducted such that the cast glass 30a is maintained at a temperature between about 650° C. and about 750° C. and a viscosity of at least $10^9$ Poise.

Referring again to the method 100 of making a glass ribbon 30b depicted in FIG. 1, the method further includes a conveying step 130 for conveying the cast glass 30a from the caster 20. The conveying aspect of step 130 can be effected in part by the action of the tractor 40. In particular, the cast glass 30a can be moved or otherwise conveyed during step 130 by the tractor 40 from the end of the caster 20 toward an optional bank of heaters 50 and edge rollers 60. According to embodiments of the method 100, the conveying step 130 can be conducted to control the velocity of the cast glass 30a, e.g., such that the flow rate of the cast glass 30a varies by no more than 1%.

The method 100 of making a glass ribbon 30b also includes a step 140 of drawing the cast glass 30a at an average viscosity less than the viscosity of the cast glass 30a in the conveying step 130, e.g., at an average viscosity of less than $10^7$ Poise. Step 140 also comprises heating the cast glass 30a to an average viscosity of less than $10^7$ Poise, e.g., with the optional bank of heaters 50. When present, the heaters 50 can include any of various structures and components for heating the cast glass 30a to an average viscosity of less than $10^7$ Poise including but not limited to resistance heating elements, induction heating elements, infrared heating elements, and others as understood by those with ordinary skill in the field of the disclosure. In some embodiments, the aspect of step 140 that involves heating the cast glass 30a to an average viscosity of less than $10^7$ Poise does not impart any additional thermal energy on the cast glass 30a. For example, the drawing step 140 can be conducted such that a core of the cast glass 30a heats the surface of the cast glass 30a at least in part to an average viscosity of less than $10^7$ Poise.

Further, the drawing step 140 of drawing the cast glass 30a is conducted to draw the cast glass 30a into a glass ribbon 30b having a width 32 ($W_{ribbon}$) that is less than or equal to the width 22 ($W_{cast}$) of the caster 20 and a final thickness (t) 34 that is less than or equal to the thickness (t) 24 of the cast glass 30a (see also FIG. 2). In some aspects, the width 32 ($W_{ribbon}$) of the glass ribbon 30b is from about 10 mm to about 5 mm, from about 20 mm to about 5 mm, from about 30 mm to about 5 mm, from about 40 mm to about 5 mm, from about 50 mm to about 5 mm, from about 100 mm to about 5 mm, from about 200 mm to about 5 mm, from about 250 mm to about 5 mm, from about 300 mm to about 5 mm, from about 350 mm to about 5 mm, from about 400 mm to about 5 mm, and all width values between these levels. The aspect of the step 140 of drawing the cast glass 30a into the ribbon 30b can be effected in part by the action of the edge rollers 60 depicted in FIG. 1.

According to some implementations of the method 100 of making a glass ribbon 30b, the drawing step 140 is conducted on the cast glass 30a for no more than 30 minutes (i.e., after the step 120 for cooling the cast glass 30a and step 130 for conveying the cast glass 30a, and before a subsequent step 150 for cooling the glass ribbon 30b to ambient temperature). It should be understood that according to the method 100, the cast glass 30a is at a temperature of about 50° C. or higher during each of the steps 110-140. In some implementations, the drawing step 140 may be conducted for 30 minutes or less, 25 minutes or less, 20 minutes or less, 15 minutes or less, 10 minutes or less, 5 minutes or less, and all durations less than these upper threshold duration values while maintaining a duration of at least 30 seconds. As noted earlier, aspects of the method 100 of making a glass ribbon 30b are conducted such that the temperature and/or time during the drawing step 140 are advantageously minimized to ensure that the cast glass 30a does not experience any or very little crystallization, while maintaining the cast glass 30a at a sufficiently low viscosity to effect the drawing aspect of this step—i.e., transforming the cast glass 30a into a glass ribbon 30b having a width 32 that is less than the width 22 of the cast glass 30a.

According to some embodiments of the method 100 of making a glass ribbon 30b depicted in FIG. 1, the conveying step 130 and the drawing step 140 are conducted such that the cast glass 30a is maintained at an average viscosity of less than $10^7$ Poise, of less than $5 \times 10^6$ Poise, of less than $10^6$ Poise, of less than $5 \times 10^5$ Poise, of less than $10^5$ Poise, of less than $5 \times 10^4$ Poise, while no lower than $10^4$ Poise, and all average viscosities between these levels. In some implementations of the method 100, the average viscosity of the cast glass 30a is maintained during the conveying step 130 and the drawing step 140 between $10^6$ Poise and $10^4$ Poise, at temperatures between 750° C. and 900° C.

Referring again to the method 100 of making a glass ribbon 30b depicted in FIG. 1, a final cooling step 150 of the method can include cooling the glass ribbon 30b to ambient temperature. As noted earlier, embodiments of the method 100 are conducted such that the glass 30 and cast glass 30a are maintained at a temperature no lower than 50° C. during steps 110-140, thus ensuring that the method 100 can be run in a continuous fashion. According to some embodiments of the method 100, steps 110-140 are conducted a temperatures of no lower than 50° C., no lower than 75° C., no lower than 100° C., no lower than 150° C., no lower than 200° C., no lower than 250° C., no lower than 300° C., and all lower temperature threshold values between these lower temperature limits. Further, the step 150 for cooling the glass ribbon 30b can be conducted with or without external cooling, as understood by those with ordinary skill in the field of the disclosure. Further, in some aspects of the method 100, the edge rollers 60 can include a cooling capability for effecting some or all of the cooling within the cooling step 150.

Still referring to the method 100 of making a glass ribbon 30b depicted in FIG. 1, embodiments of the method 100 are conducted such that the glass ribbon 30b has a thickness variation of less than 200 According to some embodiments, the glass ribbon 30b can have a thickness variation of less than 200 less than 150 less than 100 less than less than 50 less than 40 less than 30 less than 20 less than 10 less than 5 less than 4 less than 3 less than 2 less than 1 less than 0.5 and all thickness variation levels between these levels. From a practical standpoint, the glass ribbon 30b fabricated according to the method 100 may have a thickness variation as low as 0.01 In some implementations of the method 100, the glass ribbon 30b produced by the method 100 has a warp of less than 500 According to some implementations, the glass ribbon 30b produced by the method 100 has a warp of less than 500 less than 400 less than 300 less than 200 less than 150 less than 100 less than 50 less than 40 less than 30 less than 20 less than 10 less than 5 less than 0.1 above 0.05 and all warp values between these levels. From a practical standpoint, the glass ribbon 30b fabricated according to the method 100 may have a warp as low as 0.01 Still further, some embodiments of the method 100 are conducted such that the glass ribbon 30b has a surface roughness (Ra) of less than 5 µm (as measured prior to any post-processing). According to some implementations, the glass ribbon 30b produced by the method 100 has a surface roughness (Ra) of less than 5 less than 4 less than 3 less than 2 less than 1 less than 0.75 less than 0.5 less than 0.25 less than 0.1 less than 50 nm, as low as 10 nm, and all surface roughness values between these levels. According to an embodiment, the glass ribbon 30b produced by the method 100 has a surface roughness (Ra) of less than 1 µm, less than 0.9 µm, less than 0.8 µm, less than 0.7 µm, less than 0.6 µm, less than 0.5 µm, less than 0.4 µm, less than 0.3 µm, less than 0.2 µm, as low as 0.1 µm, less than 90 nm, less than 80 nm, less than 70 nm, less than 60 nm, less than 50 nm, less than 40 nm, less than 30 nm, less than 20 nm, as low as 10 nm, and all surface roughness values between these levels.

Referring now to FIG. 2, a schematic view is provided of apparatus that can be used according to the method 100 of making a glass ribbon 30b (see FIG. 1), according to the disclosure. In particular, FIG. 2 depicts a melting apparatus 10a with an orifice 4a, a caster 20 and heaters 50, among other features. In all other respects, the apparatus depicted in FIG. 2 is the same or substantially similar to the apparatus depicted in FIG. 1 for use with the method 100 of making a glass ribbon 30b (see FIG. 1 and earlier description). Accordingly, like-numbered elements in FIG. 2 have the same or substantially similar functions and structures as those depicted in FIG. 1. Further, according to an embodiment of the method 100 (see FIG. 1), the flowing step 110 can be conducted by flowing a glass 30 from an orifice 4a of the melting apparatus 10a (see FIG. 2) having a maximum dimension 12 of less than 5 meters (m). The maximum dimension 12 of the orifice 4a can be less than or equal to the width ($W_{cast}$) 22 of the caster 20. Further, the width 14 of the orifice 4a can be about 1 mm or greater, about 2 mm or greater, about 3 mm or greater, about 4 mm or greater, about 5 mm or greater, about 7 mm or greater, about 8 mm or greater, about 9 mm or greater, about 10 mm or greater, about 15 mm or greater, about 20 mm or greater, about 25 mm or greater, about 30 mm or greater, about 35 mm or greater, about 40 mm or greater, about 45 mm or greater, about 50 mm or greater, or any width up to about 500 mm.

Referring again to FIG. 2, depending on the viscosity of the glass 30 flowing from the melting apparatus 10a during the flowing step 110 (see FIG. 1), the glass 30 can have a width that is about the same as, or smaller than, the maximum dimension 12 of the orifice 4a. As such, the maximum dimension 12 of the orifice 4a can be less than or equal to the width ($W_{cast}$) 22 of the caster 20. In other embodiments, the maximum dimension 12 of the orifice 4a can be larger than the width ($W_{cast}$) 22 of the caster 20, e.g., for compositions of the glass 30 that are relatively low in upper liquidus viscosity (e.g., 5 Poise to 50000 Poise). In particular, these glasses upon melting can 'neck' as they leave the orifice 4a of the melting apparatus 10a, allowing them to flow into a caster 20 having a width 22 that is smaller in dimension than the maximum dimension 12 of the orifice 4a of the melting apparatus 10a.

As is also shown in FIG. 2, the glass ribbon 30b can be sectioned into wafers 36 having outer diameters ranging from substantially equivalent to the width 32 ($W_{ribbon}$) of the glass ribbon 30b to about 50% of the width 32 of the glass ribbon 30b. In embodiments, a step of sectioning the wafers 36 from the glass ribbon 30b can be conducted after the cooling step 150 of the method 100 outlined earlier and shown in FIG. 1. The wafers 36, as shown in exemplary form in FIG. 2, are in the form of discs. Nevertheless, the wafers 36 can take on any of a variety of shapes including, but not limited to, squares, rectangles, circles, ellipsoids and others. According to some embodiments, the wafers 36 can have a thickness 34 ($t$) of about 2 mm or less and a maximum dimension (e.g., a diameter, width or other maximum dimension) of about 100 mm to about 500 mm. In some aspects, the wafers 36 have a thickness 34 ($t$) of about 1 mm or less and a maximum dimension of 150 mm to about 300 mm. The waters 36 can also have a thickness that ranges from about 1 mm to about 50 mm, or about 1 mm to about 25 mm. The wafers 36 can also have a maximum dimension that ranges from about 25 mm to about 300 mm, from about 50 mm to about 250 mm, from about 50 mm to about 200 mm, or about 100 mm to about 200 mm. Advantageously, the wafers 36 formed according to the method 100, without any additional surface polishing, can exhibit the same thickness variation levels, surface roughness and/or warp levels outlined earlier in connection with the glass ribbon 30b. In embodiments, the wafers 36 can be subjected to some limited grinding and polishing of their outer diameters to obtain the final dimensions of the end product, e.g., lenses for optical applications.

Referring now to FIGS. 3A and 3B, schematic views of an overflow melting apparatus 10b with an isopipe 8 for flowing glass 30 as employed in a method 100 of making a glass ribbon 30b (see FIG. 1), are provided according to an embodiment. In particular, the overflow melting apparatus 10b can be employed during the step 110 of flowing glass 30. According to an embodiment, glass 30 can be melted according to a melting aspect of the method 100 and flowed from a vessel 6 into the isopipe 8. The vessel 6 includes any of a variety of heating elements understood by those with ordinary skill in the field of the disclosure for melting of glass. As the glass 30 overflows from a weir or similar aspect of the isopipe 8, it flows over the isopipe 8 and down into the caster 20 (not shown). As shown in exemplary form in FIGS. 3A and 3B, the overflow melting apparatus 10b can include a weir within the isopipe 8, which allows the glass 30 to overflow and spread along an outer surface of the isopipe 8. In such embodiments, the glass 30 can spread on one or both sides of the isopipe 8 to a width 4b. As shown in FIGS. 3A and 3B, the isopipe 8 has a one side, angled from vertical by an angle 9. Typically, angle 9 is between about 0° and 30°, preferably 0° to 20°. According to an embodiment of the method 100 of making a glass ribbon 30b (see FIG. 1), the overflow melting apparatus 10b has a width 4b of less than 5 m, which is less than or equal to the width 22 ($W_{cast}$) of the caster 20.

While exemplary embodiments and examples have been set forth for the purpose of illustration, the foregoing description is not intended in any way to limit the scope of disclosure and appended claims. Accordingly, variations and modifications may be made to the above-described embodiments and examples without departing substantially from the spirit and various principles of the disclosure. All such modifications and variations are intended to be included herein within the scope of this disclosure and protected by the following claims.

What is claimed is:

1. A glass article, comprising:
   an unpolished glass ribbon having a thickness from about 1 mm to about 25 mm and a width of 25 mm to about 200 mm,
   wherein the unpolished glass ribbon comprises a composition selected from the group consisting of borosilicate glasses, aluminoborosilicate glasses, aluminosilicate glasses, fluorosilicate glasses, phosphosilicate glasses, fluorophosphate glasses, sulfophosphate glasses, germanate glasses, vanadate glasses, phosphate glasses and borate glasses, wherein the composition further comprises an upper liquidus viscosity of less than 10 Poise,
   wherein the unpolished glass ribbon has a thickness variation from about 0.01 μm to about 50 μm and a warp from about 0.01 μm to about 10 μm, and
   further wherein the unpolished glass ribbon is capable of being sectioned into unpolished glass wafers having a thickness variation from about 0.01 μm to about 50 μm and a warp from about 0.01 μm to about 10 μm.

2. The glass article of claim 1, wherein the unpolished glass ribbon has a thickness variation from about 0.01 μm to about 0.5 μm.

3. A glass article, comprising:
   an unpolished glass wafer having a thickness from about 1 mm to about 25 mm and a width of 100 mm to about 200 mm,
   wherein the unpolished glass wafer comprises a composition selected from the group consisting of borosilicate glasses, aluminoborosilicate glasses, aluminosilicate glasses, fluorosilicate glasses, phosphosilicate glasses, fluorophosphate glasses, sulfophosphate glasses, germanate glasses, vanadate glasses, phosphate glasses and borate glasses,
   wherein the composition further comprises an upper liquidus viscosity of less than 10 Poise, and
   further wherein the unpolished glass wafer has a thickness variation from about 0.01 μm to about 50 μm and a warp from about 0.01 μm to about 10 μm.

4. The glass article of claim 3, wherein the thickness variation of the unpolished glass wafer ranges from about 0.01 μm to about 0.5 μm.

5. A glass article, comprising:
   an unpolished glass wafer,
   wherein the unpolished glass wafer comprises a composition selected from the group consisting of borosilicate glasses, aluminoborosilicate glasses, aluminosilicate glasses, fluorosilicate glasses, phosphosilicate glasses, fluorophosphate glasses, sulfophosphate glasses, germanate glasses, vanadate glasses, phosphate glasses and borate glasses,
   wherein the composition further comprises an upper liquidus viscosity of less than 10 Poise, and
   wherein the unpolished glass wafer has a thickness variation from about 0.01 μm to about 50 μm and a warp from about 0.01 μm to about 10 μm.

6. The glass article of claim 5, wherein the unpolished glass wafer has a thickness of about 2 mm or less.

7. The glass article of claim 5, wherein the unpolished glass wafer has a width of about 500 mm or less.

8. The glass article of claim 5, wherein the thickness variation of the unpolished glass wafer ranges from about 0.01 μm to about 0.5 μm.

\* \* \* \* \*

UNITED STATES PATENT AND TRADEMARK OFFICE
CERTIFICATE OF CORRECTION

| | | |
|---|---|---|
| PATENT NO. | : 11,912,605 B2 | |
| APPLICATION NO. | : 17/145970 | |
| DATED | : February 27, 2024 | |
| INVENTOR(S) | : Thierry Luc Alain Dannoux et al. | |

It is certified that error appears in the above-identified patent and that said Letters Patent is hereby corrected as shown below:

On the Title Page

Item (57), in Column 2, in "Abstract", Line 4, delete "an a" and insert -- a --.

Signed and Sealed this
Twenty-fifth Day of June, 2024

Katherine Kelly Vidal
*Director of the United States Patent and Trademark Office*